(12) United States Patent
Wang et al.

(10) Patent No.: US 12,627,320 B2
(45) Date of Patent: May 12, 2026

(54) ELECTRONIC DEVICE AND ANTENNA STRUCTURE

(71) Applicant: HUAWEI TECHNOLOGIES CO., LTD., Shenzhen (CN)

(72) Inventors: Qiang Wang, Shanghai (CN); Hanyang Wang, Reading (GB); Chen Zhang, Xi'an (CN); Chengcheng Nie, Xi'an (CN); Xiaofeng Li, Xi'an (CN)

(73) Assignee: Huawei Technologies Co., LTD., Shenzhen (CN)

( * ) Notice: Subject to any disclaimer, the term of this patent is extended or adjusted under 35 U.S.C. 154(b) by 495 days.

(21) Appl. No.: 18/005,538

(22) PCT Filed: Jul. 7, 2021

(86) PCT No.: PCT/CN2021/105035
§ 371 (c)(1),
(2) Date: Jan. 13, 2023

(87) PCT Pub. No.: WO2022/012391
PCT Pub. Date: Jan. 20, 2022

(65) Prior Publication Data
US 2023/0275603 A1 Aug. 31, 2023

(30) Foreign Application Priority Data
Jul. 16, 2020 (CN) .......................... 202010684519.1

(51) Int. Cl.
*H04B 1/00* (2006.01)
*H01Q 1/50* (2006.01)
(Continued)

(52) U.S. Cl.
CPC ............. *H04B 1/0064* (2013.01); *H01Q 5/50* (2015.01); *H04B 5/43* (2024.01); *H04B 5/266* (2024.01)

(58) Field of Classification Search
None
See application file for complete search history.

(56) References Cited

U.S. PATENT DOCUMENTS 8,610,638 B2 * 12/2013 Larsen ..................... H01Q 5/35
343/866
8,653,698 B2 * 2/2014 Baarman .................. H04B 5/77
307/104
(Continued)

FOREIGN PATENT DOCUMENTS

CN 103918192 A 7/2014
CN 108075239 A 5/2018
(Continued)

OTHER PUBLICATIONS

Office Action in Japanese Appln. No. 2023-502831, mailed on Jul. 16, 2024, 13 pages (with English translation).
(Continued)

*Primary Examiner* — Tuan A Tran
(74) *Attorney, Agent, or Firm* — Fish & Richardson P.C.

(57) ABSTRACT
Embodiments of the present application provide an electronic device for wireless communication. An example electronic device includes a low-frequency processing circuit, a high-frequency processing circuit, a coil, and at least one capacitor. The low-frequency processing circuit is electrically connected to two ends of the coil. The high-frequency processing circuit is electrically connected to the two ends of the coil. Each of the at least one capacitor is connected in parallel to the coil.

20 Claims, 4 Drawing Sheets

(51) Int. Cl.

| | | |
|---|---|---|
| *H01Q 5/335* | (2015.01) |
| *H01Q 5/50* | (2015.01) |
| *H01Q 7/00* | (2006.01) |
| *H04B 5/43* | (2024.01) |
| *H04M 1/02* | (2006.01) |
| *H04B 5/26* | (2024.01) |

(56) References Cited

U.S. PATENT DOCUMENTS

| | | | | |
|---|---|---|---|---|
| 9,002,268 | B2 * | 4/2015 | Desclos | H04B 5/24 |
| | | | | 455/41.1 |
| 9,356,345 | B2 * | 5/2016 | Wang | H01Q 7/00 |
| 9,564,683 | B2 * | 2/2017 | Won | H01P 1/213 |
| 9,985,341 | B2 * | 5/2018 | Shewan | H01Q 1/273 |
| 10,009,071 | B2 * | 6/2018 | Tanaka | H04B 5/26 |
| 10,014,577 | B2 * | 7/2018 | Cao | H01Q 21/28 |
| 10,153,537 | B2 * | 12/2018 | Baringer | H01Q 21/28 |
| 10,608,339 | B2 * | 3/2020 | Lee | H01Q 7/00 |
| 10,680,322 | B2 * | 6/2020 | Lee | H01Q 7/00 |
| 10,700,413 | B2 * | 6/2020 | Ozawa | H01Q 1/24 |
| 10,992,280 | B2 * | 4/2021 | Mimino | H02J 7/02 |
| 10,998,620 | B2 * | 5/2021 | Lee | H02J 7/00045 |
| 11,184,038 | B2 * | 11/2021 | Liu | H04B 1/48 |
| 11,881,616 | B2 * | 1/2024 | Hsu | H01Q 1/2291 |
| 2008/0300658 | A1 | 12/2008 | Meskens | |
| 2010/0277383 | A1 * | 11/2010 | Autti | H01Q 5/335 |
| | | | | 343/749 |
| 2013/0017781 | A1 * | 1/2013 | Jones | H01Q 1/243 |
| | | | | 455/90.3 |
| 2014/0168019 | A1 | 6/2014 | Hirobe et al. | |
| 2014/0347233 | A1 * | 11/2014 | Mahanfar | H01Q 1/521 |
| | | | | 343/720 |
| 2016/0020600 | A1 * | 1/2016 | Mori | H02J 50/12 |
| | | | | 307/104 |
| 2016/0066128 | A1 | 3/2016 | Konanur et al. | |
| 2019/0067798 | A1 * | 2/2019 | Hao | H04B 5/79 |

FOREIGN PATENT DOCUMENTS

| | | | |
|---|---|---|---|
| EP | 2296226 | A1 | 3/2011 |
| JP | 2012019302 | A | 1/2012 |
| JP | 2013090172 | A | 5/2013 |
| JP | 2018130028 | A | 8/2018 |
| JP | 2018170838 | A | 11/2018 |

OTHER PUBLICATIONS

Extended European Search Report in European Appln. No. 21842642. 7, mailed on Nov. 24, 2023, 9 pages.

International Search Report and Written Opinion in International Appln. No. PCT/CN2021/105035, mailed on Sep. 28, 2021, 13 pages (with English translation).

Office Action in Indian Appln. No. 202317003808, mailed on Apr. 23, 2024, 7 pages (with English translation).

Office Action in Japanese Appln. No. 2023-502831, mailed on Apr. 15, 2024, 11 pages (with English translation).

* cited by examiner

ELECTRONIC DEVICE AND ANTENNA STRUCTURE

CROSS-REFERENCE TO RELATED APPLICATIONS

This application is a National Stage of International Patent Application No. PCT/CN2021/105035, filed on Jul. 7, 2021, which claims priority to Chinese Patent Application No. 202010684519.1, filed on Jul. 16, 2020, both of which are hereby incorporated by reference in their entireties.

TECHNICAL FIELD

This application relates to the field of wireless communication, and in particular, to an electronic device and an antenna structure.

BACKGROUND

Currently, customer-premise equipment (customer premise equipment, CPE) located outdoors usually needs to transmit, to the indoors by using a power over Ethernet (power over Ethernet, PoE) network cable, a cellular network signal sent by a base station. The PoE network cable needs to pass through a window or a wall, and consequently, it is relatively difficult to arrange and route cables. When a gap of a window of a user is small or there is no hole, having been disposed on the wall, that can be borrowed, professional engineering installation and hole drilling are required, and installation costs are high. This application provides a wireless data transmission solution to replace a conventional solution in which a PoE network cable passes through a window or a wall, thereby avoiding a hole drilling step required due to a need for the cable to pass through the window and the wall, and effectively improving user experience.

SUMMARY

Embodiments of this application provide an electronic device and an antenna structure, to simultaneously implement low-frequency and high-frequency signal transmission on the electronic device by using an internal coil. Through multiplexing of a coil, in a CPE scenario, data transmission can be performed while the coil transmits power, which implements wireless data transmission and avoids a hole drilling step required due to a need for a cable to pass through a window and a wall. In addition, the multiplexing of the coil can effectively reduce a quantity of antennas inside the electronic device, which is conducive to miniaturization of the electronic device.

According to a first aspect, an electronic device is provided, including: a low-frequency processing module, a high-frequency processing module, a coil, and at least one capacitor. The low-frequency processing module is electrically connected to two ends of the coil. The high-frequency processing module is electrically connected to the two ends of the coil. Each of the at least one capacitor is connected in parallel to the coil. It should be understood that as a quantity of capacitors connected in parallel to the coil increases, voltages between inner rings and outer rings of the coil increasingly tend to be the same, and accordingly, radiation performance of the coil is better.

According to the technical solution of this embodiment of this application, by using a characteristic that the capacitor is short-circuited at a high frequency and short-circuited at a low frequency, an antenna structure including the coil and the at least one capacitor can operate at a high frequency and a low frequency at the same time. In addition, the high-frequency processing module and the low-frequency processing module respectively process signals used when the coil operates at two frequencies, so that the electronic device can simultaneously process different electrical signals, which can effectively reduce a quantity of antennas inside the electronic device, and is conducive to the miniaturization of the electronic device.

With reference to the first aspect, in some implementations of the first aspect, the electronic device further includes: a first low-pass filter, a second low-pass filter, a first high-pass filter, and a second high-pass filter. The first low-pass filter and the second low-pass filter are respectively arranged between the low-frequency processing module and the two ends of the coil. The first low-pass filter is electrically connected to the low-frequency processing module and the coil. The second low-pass filter is electrically connected to the low-frequency processing module and the coil. The first high-pass filter and the second high-pass filter are respectively arranged between the high-frequency processing module and the two ends of the coil. The first high-pass filter is electrically connected to the high-frequency processing module and the coil. The second high-pass filter is electrically connected to the high-frequency processing module and the coil.

According to the technical solution of this embodiment of this application, a high-frequency channel and a low-frequency channel can be distinguished through a high-pass filter and a low-pass filter. When the antenna structure including the coil and the at least one capacitor operates in a low-frequency mode, a high-pass filter is arranged between the antenna structure and the high-frequency processing module, and the antenna structure is open-circuited at a low frequency, which can prevent a crosstalk of low-frequency electrical signals to the high-frequency processing module. When the antenna structure operates in a high-frequency mode, a low-pass filter is arranged between the antenna structure and the low-frequency processing module, and the antenna structure is open-circuited at a high frequency, which can prevent a crosstalk of high-frequency electrical signals to the low-frequency processing module. The high-pass filter and the low-pass filter can be added to the electronic device, to effectively reduce a problem of signal interference.

With reference to the first aspect, in some implementations of the first aspect, the low-frequency processing module is configured to process an electrical signal for wireless charging.

With reference to the first aspect, in some implementations of the first aspect, the high-frequency processing module is configured to process an electrical signal for data transmission.

According to the technical solution of this embodiment of this application, the electronic device can be used as CPE. For example, the CPE may include a first electronic device located outdoors and a second electronic device located indoors, and the first electronic device and the second electronic device are one of the electronic devices provided above. The second electronic device located indoors can supply power to the first electronic device through a coil, and at the same time, the first electronic device can also transmit data of a received cellular network signal to the second electronic device through a coil. Through wireless transmission between the coil of the first electronic device and the coil of the second electronic device, a PoE network cable can be prevented from passing through a window or a wall, and a need for professional engineering installation and hole drilling is eliminated, which can greatly improve user experience.

With reference to the first aspect, in some implementations of the first aspect, the low-frequency processing module is configured to process an electrical signal for near field communication NFC.

With reference to the first aspect, in some implementations of the first aspect, the high-frequency processing module is configured to process an electrical signal for a wireless fidelity Wi-Fi frequency band.

The technical solution according to this embodiment of this application can also be applied to user equipment. When indoor user equipment is within a specific range of a Wi-Fi signal source, the user equipment can obtain a Wi-Fi password through NFC, which is more convenient and conducive to improving user experience.

With reference to the first aspect, in some implementations of the first aspect, a capacitance value of each of the at least one capacitor is between 0.5 pF and 5 pF.

According to the technical solution of this embodiment of this application, the capacitance value of each of the at least one capacitor can be adjusted based on an actual design or production needs. The capacitance values of the capacitors may be different or the same.

With reference to the first aspect, in some implementations of the first aspect, a capacitance value of each of the at least one capacitor is 1 pF.

According to the technical solution of this embodiment of this application, the capacitance value of each of the at least one capacitor can be adjusted based on an actual design or production needs.

With reference to the first aspect, in some implementations of the first aspect, each of the at least one capacitor is a distributed capacitor or a lumped capacitor.

According to the technical solution of this embodiment of this application, when the capacitor is a distributed capacitor, the capacitance value of the capacitor may vary with a frequency radiated by the antenna structure, which can provide better matching for the antenna structure. When the capacitor is a lumped capacitor, a volume of the capacitor is smaller, which is conducive to the miniaturization of the antenna structure.

With reference to the first aspect, in some implementations of the first aspect, the electronic device further includes a first antenna unit, and an operating frequency band of the first antenna unit covers at least one frequency band in a cellular network.

According to the technical solution of this embodiment of this application, the first antenna unit may be configured to receive a cellular network signal transmitted by a network device, and transmit the signal to another electronic device by using the antenna structure formed by the coil and the at least one capacitor.

With reference to the first aspect, in some implementations of the first aspect, the electronic device further includes a second antenna unit, and an operating frequency band of the second antenna unit covers a Wi-Fi frequency band.

According to the technical solution of this embodiment of this application, the second antenna unit may be configured to convert, into a Wi-Fi signal, an electrical signal that is received by the antenna structure formed by the coil and the at least one capacitor and that is processed by the high-frequency processing module.

With reference to the first aspect, in some implementations of the first aspect, one end of each of the at least one capacitor is electrically connected to the coil at an outermost ring of the coil, and the other end is electrically connected to the coil at an innermost ring of the coil.

According to the technical solution of this embodiment of this application, when a capacitor is connected in parallel between an innermost side and an outermost side of the coil, if the capacitor is in a short-circuit state, conduction between the outermost ring of the coil and the innermost ring is implemented, so that a radiation area of the coil is increased when the coil is used as a communications antenna, and the radiation performance of the coil is better.

With reference to the first aspect, in some implementations of the first aspect, a plane size of the coil is less than or equal to 80 mm×80 mm.

According to the technical solution of this embodiment of this application, a size of the coil in the foregoing electronic device can be adjusted based on an actual design or production needs.

According to a second aspect, an antenna structure is provided, including: a coil and at least one capacitor. Each of the at least one capacitor is connected in parallel to the coil.

With reference to the second aspect, in some implementations of the second aspect, the coil is a wireless charging coil or a low-frequency communications coil.

With reference to the second aspect, in some implementations of the second aspect, the low-frequency communications coil is a near field communication NFC coil.

With reference to the second aspect, in some implementations of the second aspect, a capacitance value of each of the at least one capacitor is between 0.5 pF and 5 pF.

With reference to the second aspect, in some implementations of the second aspect, a capacitance value of each of the at least one capacitor is 1 pF.

With reference to the second aspect, in some implementations of the second aspect, a plane size of the coil is less than or equal to 80 mm×80 mm.

DESCRIPTION OF EMBODIMENTS

The following describes technical solutions of this application with reference to the accompanying drawings.

Figure 1:
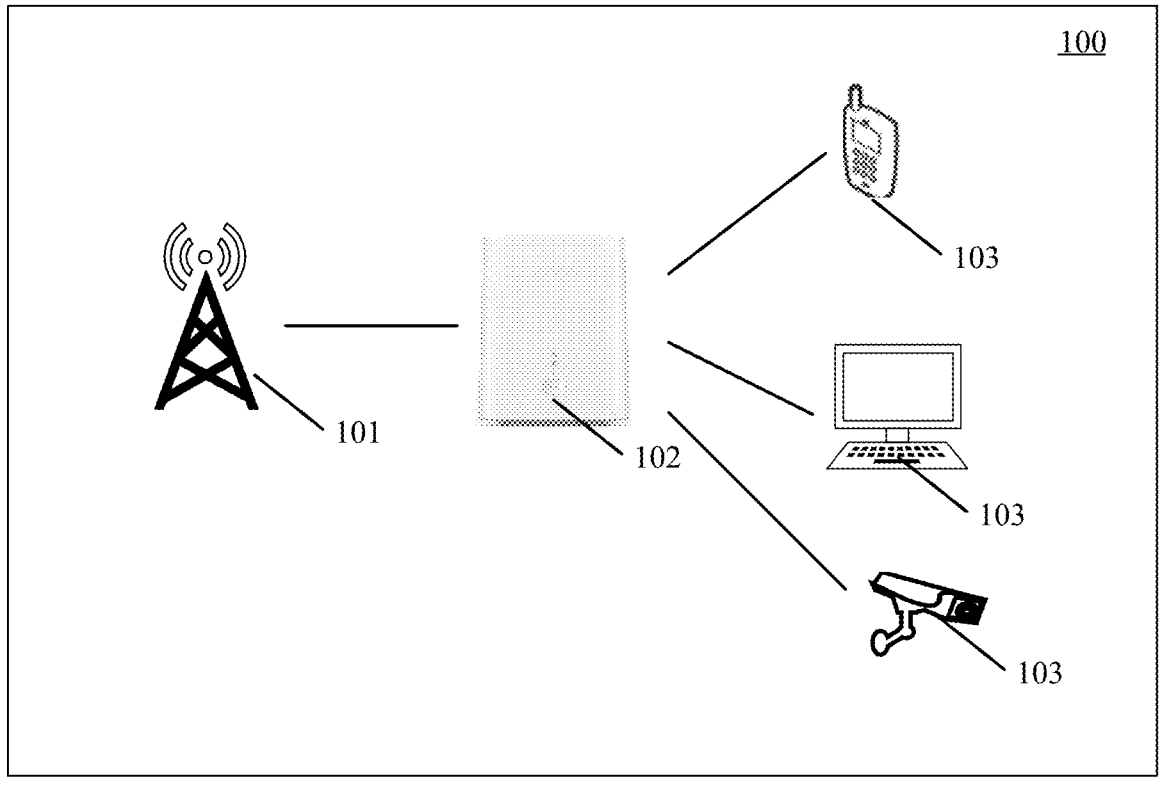
FIG. 1 is a schematic diagram of an architecture of a mobile communications system applicable to an embodiment of this application.

FIG. 1 is a schematic diagram of an architecture of a mobile communications system applicable to an embodiment of this application.

As shown in FIG. 1, the mobile communications system 100 may include at least one network device 101, at least one CPE 102, and at least one user equipment (user equipment, UE) 103. FIG. 1 is merely a schematic diagram, and the communications system may further include other network devices, such as a wireless relay device and a wireless backhaul device, which are not shown in FIG. 1. This embodiment of this application does not limit a quantity and specific types of network devices and UEs included in the mobile communications system.

The UE 103 in this embodiment of this application may be a mobile phone, a tablet computer, a notebook computer, a smart band, a smartwatch, a smart helmet, smart glasses, or the like. The electronic device may be alternatively a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, an electronic device in a 5G network, an electronic device in a future evolved public land mobile network (public land mobile network, PLMN), or the like. This is not limited in embodiments of this application. The technical solution provided in this application is applicable to the UE 103 that uses one or more of the following communications technologies: a Bluetooth (Bluetooth, BT) communications technology, a global positioning system (global positioning system, GPS) communications technology, a wireless fidelity (wireless fidelity, Wi-Fi) communications technology, a global system for mobile communications (global system for mobile communications, GSM) communications technology, a wideband code division multiple access (wideband code division multiple access, WCDMA) communications technology, a long term evolution (long term evolution, LTE) communications technology, a 5G communications technology, and another future communications technology.

The network device 101 in this embodiment of this application may be a device configured to communicate with a terminal device, and the network device may be a network device (base transceiver station, BTS) in a GSM system or code division multiple access (code division multiple access, CDMA), or may be a network device (NodeB, NB) in a WCDMA system, or may be an evolved network device (evolutional nodeB, eNB or eNodeB) in an LTE system. Alternatively, the network device may be a relay station, an access point, a vehicle-mounted device, a wearable device, a network device in a future 5G network (new generation NodeB, gNB or gNodeB) or a network device in a future evolved PLMN network, and a later network device that supports a 3rd generation partnership project (3GPP) protocol version. This is not limited in this embodiment of this application.

It should be understood that the CPE 102 can connect the user equipment 103 to the Internet by receiving a cellular network signal sent by the network device 101 and transmitting the cellular network signal to the user equipment 103. For example, the CPE 102 can convert, into a Wi-Fi signal, a 2G/3G/4G/5G signal transmitted by the network device 101, to connect the user equipment 103 to the Internet.

However, in a conventional technical solution, the CPE 102 is usually located outdoors, and transmits a signal to the indoor user equipment 103 through a PoE network cable. The PoE network cable needs to pass through a window or a wall, and consequently, it is relatively difficult to arrange and route cables. When a gap of a window of a user is small or there is no hole, on the wall, that can be borrowed, professional engineering installation and hole drilling are required, and installation costs are high.

This application provides an electronic device that can be applied to the foregoing scenarios, and can wirelessly transmit, from the outdoors to the indoors, a cellular network signal sent by the network device. Therefore, it does not require the PoE network cable to pass through a window or a wall, and a need for professional engineering installation and hole drilling is eliminated. This can greatly improve user experience.

Figure 2:
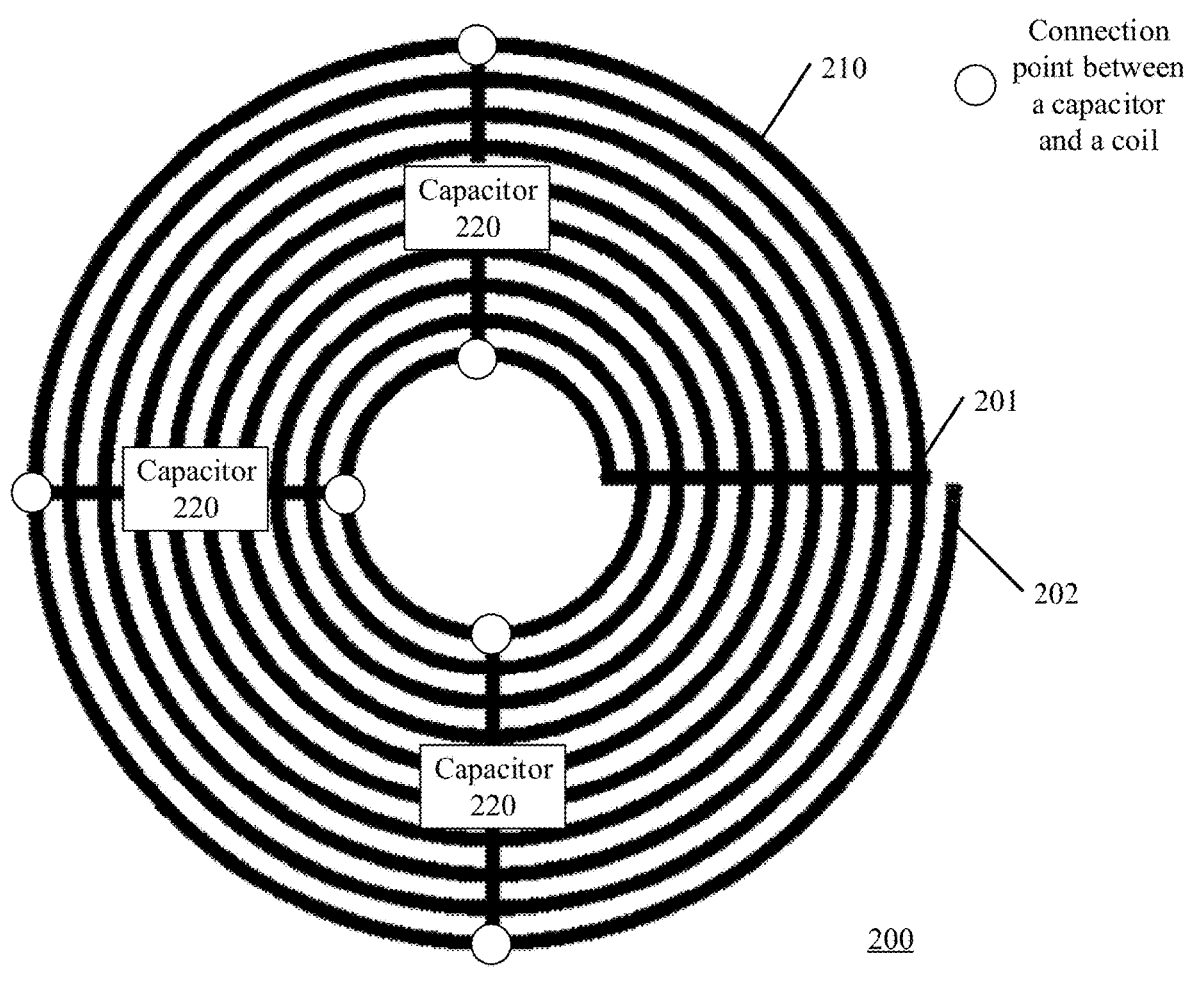
FIG. 2 is a schematic diagram of an antenna structure according to an embodiment of this application.

FIG. 2 is a schematic diagram of an antenna structure according to an embodiment of this application, and the antenna structure may be applied to the CPE or UE in the scenario shown in FIG. 1.

As shown in FIG. 2, the antenna structure 200 may include a coil 210 and at least one capacitor 220.

The capacitor 220 may be connected in parallel to the coil 210. The parallel connection can be understood as follows: One end of the capacitor 220 is electrically connected to the coil 210 at an outer ring of the coil 210, and the other end of the capacitor 220 is electrically connected to the coil 210 at an inner ring of the coil 210, in other words, the capacitor 220 is connected in parallel to the coil 210.

Optionally, the outer ring of the coil 210 may be an outermost layer of coil of the coil 210, or may be one of several layers of coil adjacent to the outermost layer of coil. This may be selected based on an actual design or simulation. It should be understood that the inner ring of the coil 210 can also be understood correspondingly. In addition, the outer ring and the inner ring are relative concepts, to be specific, the outer ring is only required to be axially outside a location at which the inner ring is located.

The coil 210 of this embodiment of this application is obtained by adding, to a conventional design, at least one capacitor 220 arranged in parallel.

When the antenna structure 200 operates in a low-frequency mode, the capacitor 220 connected in parallel to the coil 210 is in an open-circuit state, and the paralleled connected capacitor 220 does not affect normal operation of the coil 210. Usually, it can be understood that the low-frequency mode is below 100 MHz. For example, the coil 210 operating in the low-frequency mode may be a wireless charging coil or a near field communication (NFC) coil. When the coil 210 is a wireless charging coil, an operating frequency of the antenna structure 200 in the low-frequency mode is dozens of kHz. When the coil 210 is an NFC coil, the operating frequency of the antenna structure 200 in the low-frequency mode is 13.6 MHz.

When the antenna structure 200 operates in a high-frequency mode, the capacitor 220 connected in parallel to the coil 210 is in a short-circuit state, so that conduction between the inner ring and the outer ring of the coil 210 can be ensured. In this case, voltages between inner rings and outer rings of the coil 210 are balanced, and the coil 210 as a whole may be used as an entity, may be used as a radiator operating in the high-frequency mode, and has good radiation features. Usually, it can be understood that the high-frequency mode is above 1 GHz. For example, the coil 210 operating in the high-frequency mode may operate in a 2G/3G/4G/5G related frequency band, or may operate in a 2.4 GHz or 5 GHz Wi-Fi frequency band.

It should be understood that as a quantity of capacitors 220 connected in parallel to the coil 210 increases, voltages between inner rings and outer rings of the coil 210 increasingly tend to be the same, and accordingly, radiation performance of the coil is better. A quantity of capacitors 220 connected in parallel to the coil 210 can be determined based on an actual design or simulation.

Optionally, a first end 201 and a second end 202 of the coil 210 may be electrically connected to a front-end circuit of an electronic device, for transmitting an electrical signal. For example, when the coil 210 is a wireless charging coil, the first end 201 and the second end 202 may be electrically connected to a wireless charging module in the electronic device. Alternatively, when the coil 210 is a high-frequency communications antenna, the first end 201 may be electrically connected to a radio frequency module in the electronic device, and the second end 202 may be electrically connected to a reference ground in the electronic device.

Optionally, a capacitance value of the capacitor 220 may be between 0.5 pF and 5 pF.

Optionally, a capacitance value of the capacitor 220 may be 1 pF. It should be understood that the capacitance value of the capacitor 220 can be selected based on an actual design or simulation. This is not limited in this application.

Optionally, the capacitor 220 may be a distributed capacitor or a lumped capacitor. When the capacitor 220 is a distributed capacitor, the capacitance value of the capacitor 220 may vary with a frequency radiated by the antenna structure, which can provide better matching for the antenna structure. When the capacitor 220 is a lumped capacitor, a volume of the capacitor 220 is smaller, which is conducive to the miniaturization of the antenna structure.

Optionally, the plane size of the coil 210 is less than or equal to 80 mm×80 mm, which is conducive to the miniaturization of the antenna structure.

Figure 3:
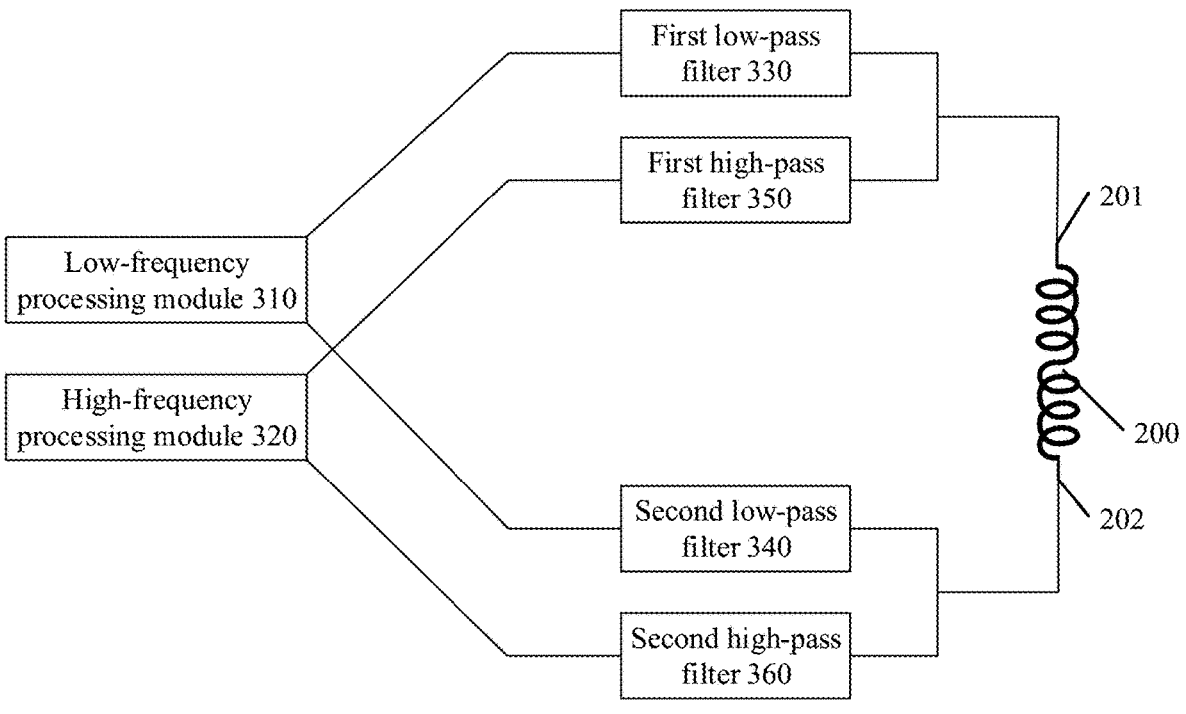
FIG. 3 is a schematic diagram of a structure of an electronic device according to an embodiment of this application.

FIG. 3 is a schematic diagram of a structure of an electronic device according to an embodiment of this application.

As shown in FIG. 3, the electronic device may include a low-frequency processing module 310, a high-frequency processing module 320, and an antenna structure 200, and the antenna structure 200 may be the foregoing antenna structure shown in FIG. 2.

The low-frequency processing module 310 may be separately electrically connected to the first end 201 and the second end 202 of the coil in the antenna structure 200. The high-frequency processing module 320 may be separately electrically connected to the first end 201 and the second end 202 of the coil in the antenna structure 200. The low-frequency processing module 310 can be configured to process an electrical signal used when capacitors connected in parallel in the antenna structure 200 are open-circuited, to be specific, can process an electrical signal with a frequency less than 100 MHz. The high-frequency processing module 320 can be configured to process an electrical signal used when capacitors connected in parallel in the antenna structure 200 are short-circuited, to be specific, can process an electrical signal with a frequency greater than 1 GHz.

Optionally, when the antenna structure 200 operates in the high-frequency mode, in the high-frequency processing module 320, the antenna structure 200 may be electrically connected to a high-frequency processing circuit at the first end 201 of the coil, the second end 202 of the coil may be grounded, and a matching network can be added between the second end 202 and the ground. This can suppress currents in other frequency bands and increase overall performance of the antenna structure.

Optionally, the electronic device 300 may further include a first low-pass filter 330, a second low-pass filter 340, a first high-pass filter 350, and a second high-pass filter 360.

The first low-pass filter 330 may be arranged between the low-frequency processing module 310 and the first end 201 of the coil in the antenna structure 200, and is electrically connected to the low-frequency processing module 310 and the antenna structure 200. The second low-pass filter 340 may be arranged between the low-frequency processing module 310 and the second end 202 of the coil in the antenna structure 200, and is electrically connected to the low-frequency processing module 310 and the antenna structure 200. The first high-pass filter 350 may be arranged between the low-frequency processing module 310 and the first end 201 of the coil in the antenna structure 200, and is electrically connected to the low-frequency processing module 310 and the antenna structure 200. The second high-pass filter 360 may be arranged between the low-frequency processing module 310 and the second end 202 of the coil in the antenna structure 200, and is electrically connected to the low-frequency processing module 310 and the antenna structure 200.

It should be understood that, in the electronic device provided in this embodiment of this application, a high-frequency channel and a low-frequency channel can be distinguished through a high-pass filter and a low-pass filter. When the antenna structure 200 operates in a low-frequency mode, a high-pass filter is arranged between the antenna structure 200 and the high-frequency processing module 320, and the antenna structure is open-circuited at a low frequency, which can prevent a crosstalk of low-frequency electrical signals to the high-frequency processing module 320. When the antenna structure 200 operates in a high-frequency mode, a low-pass filter is arranged between the antenna structure 200 and the low-frequency processing module 310, and the antenna structure is open-circuited at a high frequency, which can prevent a crosstalk of high-frequency electrical signals to the low-frequency processing module 310. The high-pass filter and the low-pass filter can be added to the electronic device, to effectively reduce a problem of signal interference.

Figure 4:
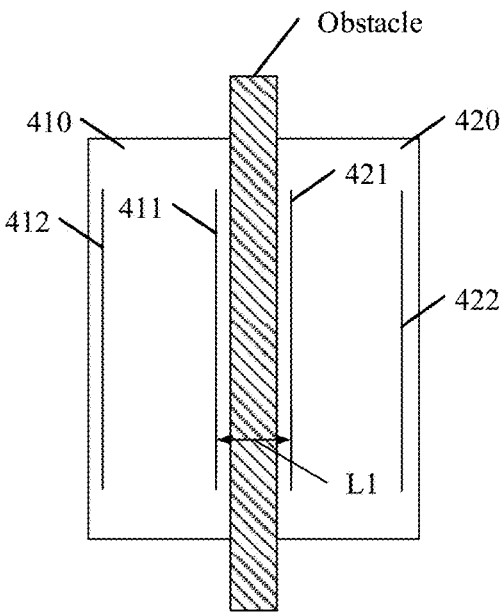
FIG. 4 is a schematic diagram of an application scenario of an electronic device according to an embodiment of this application.

FIG. 4 is a schematic diagram of an application scenario of an electronic device according to an embodiment of this application.

It should be understood that the CPE shown in FIG. 1 can be divided into an indoor unit (indoor unit, IDU) located indoors and an outdoor unit (outdoor unit, ODU) located outdoors. Therefore, the electronic device provided in this embodiment of this application may be an IDU or an ODU.

As shown in FIG. 4, a first electronic device 410 and a second electronic device 420 may be respectively located on two sides of an obstacle, and the first electronic device 410 and the second electronic device 420 are disposed opposite to each other.

The obstacle may be a window or a wall. The first electronic device 410 and the second electronic device 420 are the electronic device shown in FIG. 3. The first electronic device 410 may include a first antenna structure 411, a first low-frequency module, and a first high-frequency module. The second electronic device 420 may include a second antenna structure 421, a second low-frequency module, and a second high-frequency module.

The first electronic device 410 may be an ODU and is arranged outdoors. The first antenna structure 411 may be a charging coil when operating in a low-frequency mode, and may be a communications antenna when operating in a high-frequency mode. Correspondingly, a first low-frequency processing mode in the first electronic device 410 may be configured to process an electrical signal for wireless charging, and a first high-frequency processing module may be configured to process an electrical signal for data transmission.

The second electronic device 420 may be an IDU and is arranged indoors. The second antenna structure 421 may be a charging coil when operating in a low-frequency mode, and may be a communications antenna when operating in a high-frequency mode. Correspondingly, a second low-frequency processing mode in the second electronic device 420 may be configured to process an electrical signal for wireless charging, and a second high-frequency processing module may be configured to process an electrical signal for data transmission.

The second antenna structure 421 of the second electronic device 420 can be used as a transmit charging coil, and the first antenna structure 411 of the first electronic device 410 can be used as a receive charging coil. The second electronic device 420 located indoors can process, by using the second low-frequency processing module, an electrical signal for wireless charging, send, by using the second antenna structure 421, an electrical signal for wireless charging to the first antenna structure 411, and power the first electronic device 410 by using the first low-frequency processing module. Therefore, the first electronic device 410 located outdoors can be powered by using the second electronic device 420, no additional power supply is required, and an internal structure of the first electronic device 410 is simpler.

At the same time, the electronic device 410 located outdoors can process, by using the first high-frequency processing module, an electrical signal that carries data, and send, to the second antenna structure 421 by using the first antenna structure 411, an electrical signal that carries data. After processing of the second high-frequency processing module, the second electronic device 420 can obtain transmitted data. It should be understood that data transmission is bidirectional, and the second electronic device 420 also transmits data to the first electronic device 410 through a similar path.

Optionally, a distance L1 between the first antenna structure 411 and the second antenna structure 421 may be less than 10 cm, and may be 5 cm. The distance L1 between the first antenna structure 411 and the second antenna structure 421 may be a horizontal distance between the first antenna structure 411 and the second antenna structure 421, or may be a straight-line distance between closest points on the first antenna structure 411 and the second antenna structure 421.

Optionally, plane sizes of the first antenna structure 411 and the second antenna structure 421 may be different, to be specific, diameters of a coil in the first antenna structure 311 and a coil in the second antenna structure 321 may be different. It should be understood that an adjustment can be made based on an actual design or a simulation result. This is not limited in this application.

Optionally, the first electronic device 410 may further include a first antenna unit 412, and an operating frequency band of the first antenna unit 412 may cover at least one frequency band in a cellular network, and may be used for data transmission with a network device. The cellular network may include 2G, 3G, 4G, 5G, or future communications systems.

Optionally, the second electronic device 420 may further include a second antenna unit 422, and an operating frequency band of the second antenna unit 422 may cover a Wi-Fi frequency band, and may be used for data transmission with indoor user equipment. The Wi-Fi frequency band may be at least one of a 2.4 GHz or 5 G frequency band.

It should be understood that a cellular network signal may be converted into a Wi-Fi signal through the first electronic device 410 and the second electronic device 420, and a cellular network signal sent by the network device can be wirelessly transmitted from the outdoors to the indoors. Therefore, it does not require the PoE network cable to pass through a window or a wall, and a need for professional engineering installation and hole drilling is eliminated. This is convenient and quick, and greatly improves user experience.

Optionally, the second antenna unit 422 may be alternatively the antenna structure shown in FIG. 2. The second antenna unit 422 may be an NFC coil when operating in a low-frequency mode, and when operating in a high-frequency mode, may be an antenna operating in a Wi-Fi frequency band. Then, a corresponding low-frequency processing module of the second antenna unit 422 may be configured to process an electrical signal for NFC, and a corresponding high-frequency processing module may be configured to process an electrical signal for a Wi-Fi frequency band.

Therefore, the electronic device provided in this embodiment of this application may be alternatively the user equipment shown in FIG. 1, and the user equipment may include the antenna structure shown in FIG. 2. In the antenna structure, an NFC coil and a Wi-Fi antenna can be combined to reduce a quantity of antennas in the user equipment and provide a larger arrangement space for antennas operating in other frequency bands. At the same time, when the indoor user equipment is within a specific range of the second antenna unit 322, the user equipment can obtain a Wi-Fi password through NFC, which is more convenient and conducive to improving user experience.

It should be understood that for the coil provided in this embodiment of this application, through a design of connecting a capacitor in parallel and by using a characteristic that the capacitor is short-circuited at a high frequency and short-circuited at a low frequency, the coil can operate at a high frequency and a low frequency at the same time. The high-frequency processing module and the low-frequency processing module respectively process signals at the two frequencies. Therefore, the coil provided in this embodiment of this application may alternatively be another low-frequency communications coil, and is not only limited to a wireless charging coil or an NFC coil.

Figure 5:
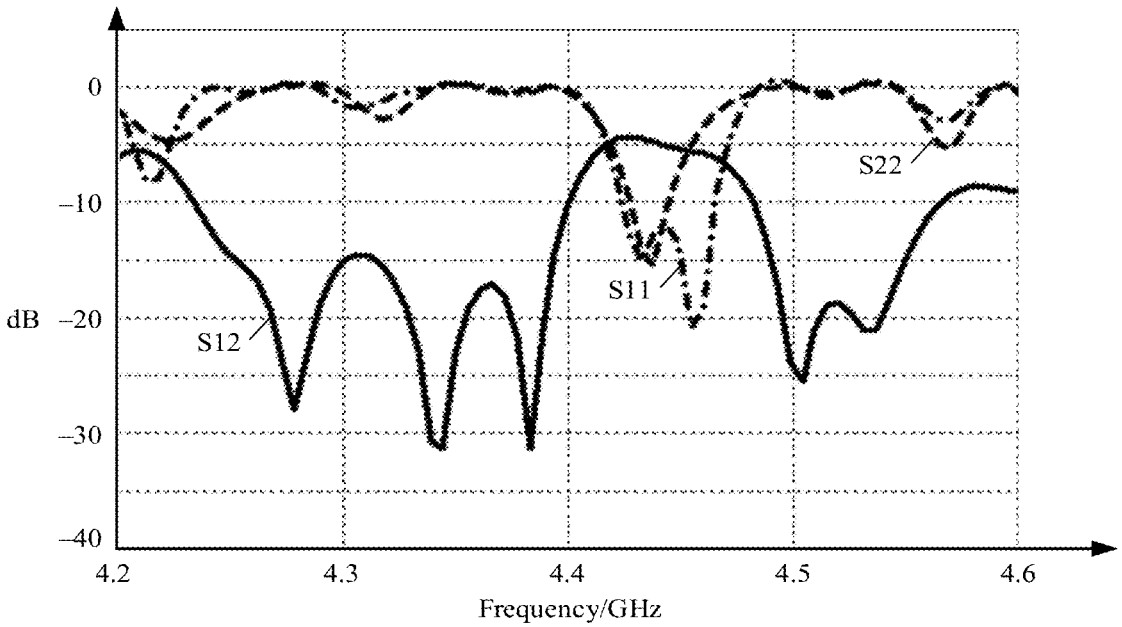
FIG. 5 is a schematic diagram of S-parameter simulation used when no capacitor is connected in parallel to a coil.
Figure 6:
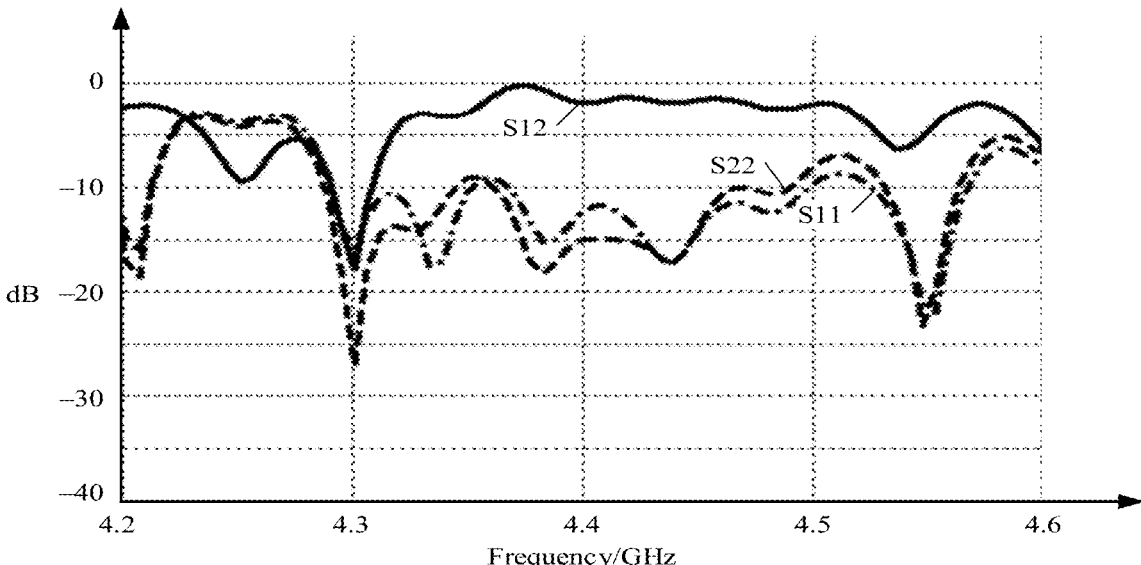
FIG. 6 is a schematic diagram of S-parameter simulation used when a capacitor is connected in parallel to a coil.

FIG. 5 and FIG. 6 are schematic diagrams of S-parameter simulation between the first antenna structure and the second antenna structure shown in FIG. 4. FIG. 5 is a schematic diagram of S-parameter simulation used when no capacitor is connected in parallel to a coil. FIG. 6 is a schematic diagram of S-parameter simulation used when a capacitor is connected in parallel to a coil.

As shown in FIG. 5 and FIG. 6, a port 1 may be a connection port between the coil and the high-frequency processing module in the first antenna structure of the first electronic device, and a port 2 may be a connection port between the coil and the high-frequency processing module in the second antenna structure of the second electronic device. After a capacitor is connected in parallel to the coil, a larger parameter S12 indicates more electrical signals transmitted from the port 2 to the port 1, and indicates better signal transmission performance between the first antenna structure and the second antenna structure. At the same time, a smaller parameter S11 indicates smaller reflection at the port 1, and indicates more electrical signals transmitted to the port 2. Similarly, a smaller parameter S22 indicates smaller reflection at the port 2, and indicates more electrical signals transmitted to the port 1.

Optionally, with S12 greater than −5 dB as a limit, after a capacitor is added to the coil, in a high-frequency mode, there may be a bandwidth of about 200 MHz to ensure good signal transmission characteristics between the first antenna structure and the second antenna structure.

A person skilled in the art may use different methods to implement the described functions for each specific application, but such implementation should not be considered beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
a low-frequency processing circuit, a high-frequency processing circuit, a coil, and at least one capacitor, wherein
the low-frequency processing circuit is electrically connected to two ends of the coil;
the high-frequency processing circuit is electrically connected to the two ends of the coil; and
each of the at least one capacitor is connected in parallel to the coil, wherein a first end of each of the at least one capacitor and a second end of each of the at least one capacitor are connected to the coil, wherein the first end of each of the at least one capacitor is electrically connected to the coil at an outermost ring of the coil, and the second end of each of the at least one capacitor is electrically connected to the coil at an innermost ring of the coil.

2. The electronic device according to claim 1, wherein the electronic device further comprises:
a first low-pass filter, a second low-pass filter, a first high-pass filter, and a second high-pass filter, wherein
the first low-pass filter and the second low-pass filter are respectively arranged between the low-frequency processing circuit and the two ends of the coil, the first low-pass filter is electrically connected to the low-frequency processing circuit and the coil, and the second low-pass filter is electrically connected to the low-frequency processing circuit and the coil; and
the first high-pass filter and the second high-pass filter are respectively arranged between the high-frequency processing circuit and the two ends of the coil, the first high-pass filter is electrically connected to the high-frequency processing circuit and the coil, and the second high-pass filter is electrically connected to the high-frequency processing circuit and the coil.

3. The electronic device according to claim 2, wherein the low-frequency processing circuit is configured to process an electrical signal for wireless charging.

4. The electronic device according to claim 3, wherein the high-frequency processing circuit is configured to process an electrical signal for data transmission.

5. The electronic device according to claim 2, wherein the low-frequency processing circuit is configured to process an electrical signal for near field communication (NFC).

6. The electronic device according to claim 5, wherein the high-frequency processing circuit is configured to process an electrical signal for a wireless fidelity (Wi-Fi) frequency band.

7. The electronic device according to claim 1, wherein a capacitance value of each of the at least one capacitor is between 0.5 pF and 5 pF.

8. The electronic device according to claim 7, wherein a capacitance value of each of the at least one capacitor is 1 pF.

9. The electronic device according to claim 1, wherein each of the at least one capacitor is a distributed capacitor or a lumped capacitor.

10. The electronic device according to claim 1, wherein the electronic device further comprises:
a first antenna unit, wherein an operating frequency band of the first antenna unit covers at least one frequency band in a cellular network.

11. The electronic device according to claim 1, wherein the electronic device further comprises:
a second antenna unit, wherein an operating frequency band of the second antenna unit covers a Wi-Fi frequency band.

12. The electronic device according to claim 1, wherein a plane size of the coil is less than or equal to 80 mm×80 mm.

13. A communications system, comprising:
a base station, configured to transmit a signal; and
an electronic device, configured to receive the signal from the base station, wherein the electronic device comprises:
a low-frequency processing circuit, a high-frequency processing circuit, a coil, and at least one capacitor, wherein
the low-frequency processing circuit is electrically connected to two ends of the coil;
the high-frequency processing circuit is electrically connected to the two ends of the coil; and
each of the at least one capacitor is connected in parallel to the coil, wherein a first end of each of the at least one capacitor and a second end of each of the at least one capacitor are connected to the coil, wherein the first end of each of the at least one capacitor is electrically connected to the coil at an outermost ring of the coil, and the second end of each of the at least one capacitor is electrically connected to the coil at an innermost ring of the coil.

14. The communications system according to claim 13, wherein the electronic device further comprises:
a first low-pass filter, a second low-pass filter, a first high-pass filter, and a second high-pass filter, wherein
the first low-pass filter and the second low-pass filter are respectively arranged between the low-frequency processing circuit and the two ends of the coil, the first low-pass filter is electrically connected to the low-frequency processing circuit and the coil, and the second low-pass filter is electrically connected to the low-frequency processing circuit and the coil; and the first high-pass filter and the second high-pass filter are respectively arranged between the high-frequency processing circuit and the two ends of the coil, the first high-pass filter is electrically connected to the high-frequency processing circuit and the coil, and the second high-pass filter is electrically connected to the high-frequency processing circuit and the coil.

15. The communications system according to claim 14, wherein the low-frequency processing circuit is configured to process an electrical signal for wireless charging.

16. The communications system according to claim 15, wherein the high-frequency processing circuit is configured to process an electrical signal for data transmission.

17. The communications system according to claim 14, wherein the low-frequency processing circuit is configured to process an electrical signal for near field communication (NFC).

18. The communications system according to claim 17, wherein the high-frequency processing circuit is configured to process an electrical signal for a wireless fidelity (Wi-Fi) frequency band.

19. The communications system according to claim 13, wherein a capacitance value of each of the at least one capacitor is between 0.5 pF and 5 pF.

20. The communications system according to claim 19, wherein a capacitance value of each of the at least one capacitor is 1 pF.

* * * * *